United States Patent
Liu et al.

(10) Patent No.: US 10,772,120 B2
(45) Date of Patent: Sep. 8, 2020

(54) METHOD AND ACCESS NODE FOR SIGNALING SCHEDULING INFORMATION TO TERMINAL DEVICE AND METHOD AND TERMINAL DEVICE FOR PERFORMING SCHEDULED COMMUNICATIONS

(71) Applicant: Telefonaktiebolaget LM Ericsson (publ), Stockholm (SE)

(72) Inventors: Jinhua Liu, Beijing (CN); Robert Baldemair, Solna (SE); Virgile Garcia, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 164 days.

(21) Appl. No.: 15/563,502

(22) PCT Filed: Apr. 17, 2015

(86) PCT No.: PCT/CN2015/076853
§ 371 (c)(1),
(2) Date: Sep. 29, 2017

(87) PCT Pub. No.: WO2016/165119
PCT Pub. Date: Oct. 20, 2016

(65) Prior Publication Data
US 2018/0092120 A1    Mar. 29, 2018

(51) Int. Cl.
*H04L 5/00*         (2006.01)
*H04W 72/08*        (2009.01)
(Continued)

(52) U.S. Cl.
CPC ....... *H04W 72/1289* (2013.01); *H04L 5/0048* (2013.01); *H04W 72/0446* (2013.01);
(Continued)

(58) Field of Classification Search
CPC .................. H04W 72/0446; H04L 5/0048
See application file for complete search history.

(56) References Cited

U.S. PATENT DOCUMENTS

| 9,179,441 B2 | 11/2015 | Xue et al. |
| 9,326,290 B2 | 4/2016 | Zhu et al. |
| (Continued) | | |

FOREIGN PATENT DOCUMENTS

| CN | 102056174 A | 5/2011 |
| CN | 102340875 A | 2/2012 |
| (Continued) | | |

OTHER PUBLICATIONS

International Search Report and Written Opinion for International Patent Application No. PCT/CN2015/076853, dated Jan. 18, 2016, 7 pages.
(Continued)

*Primary Examiner* — Angel T Brockman
(74) *Attorney, Agent, or Firm* — Patent Portfolio Builders, PLLC (57) ABSTRACT

The disclosure provides a method in an access node for signaling scheduling information to a terminal device and the associated access node. The method comprises generating one or more scheduling messages for scheduling data transmissions over two or more types of radio resources available on a radio link. The method further comprises transmitting the one or more scheduling messages to the terminal device. Also, the disclosure provides a method in a terminal device for performing scheduled communications and the associated terminal device. The method comprises receiving, from an access node, one or more scheduling messages, which are generated for scheduling data transmissions over two or more types of radio resources available on a radio link. The method further comprises performing
(Continued)

Dedicated resource

Prohibited resource

Shared resource

Unused dedicated resource allocated to neighboring link

Template frame for link 1

Template frame for link 2 the scheduled communications according to the received one or more scheduling messages.

32 Claims, 6 Drawing Sheets

(51) Int. Cl.
    *H04W 72/12*     (2009.01)
    *H04W 72/04*     (2009.01)

(52) U.S. Cl.
    CPC ....... *H04W 72/08* (2013.01); *H04W 72/1215* (2013.01); *H04W 72/042* (2013.01); *H04W 72/1226* (2013.01)

(56) References Cited

U.S. PATENT DOCUMENTS

| | | |
|---|---|---|
| 2010/0034303 A1 | 2/2010 | Damnjanovic et al. |
| 2011/0044260 A1* | 2/2011 | Narasimha .......... H04W 74/008 370/329 |
| 2012/0120903 A1* | 5/2012 | Kim ....................... H04B 7/024 370/329 |
| 2015/0049676 A1* | 2/2015 | Tiirola .................. H04L 1/1861 370/329 |
| 2015/0103934 A1* | 4/2015 | Nam ..................... H04B 7/0413 375/260 |
| 2015/0365940 A1* | 12/2015 | Chu ..................... H04B 7/0452 370/329 |

FOREIGN PATENT DOCUMENTS

| | | |
|---|---|---|
| WO | 2008073013 A1 | 6/2008 |
| WO | 2010131841 A2 | 11/2010 |
| WO | 2010141607 A2 | 12/2010 |

OTHER PUBLICATIONS

Extended European Search Report issued in corresponding EP Application No. 15888824.8; dated Nov. 28, 2018; 11 Pages.

\* cited by examiner

METHOD AND ACCESS NODE FOR SIGNALING SCHEDULING INFORMATION TO TERMINAL DEVICE AND METHOD AND TERMINAL DEVICE FOR PERFORMING SCHEDULED COMMUNICATIONS

This application is a 35 U.S.C. § 371 national phase filing of International Application No. PCT/CN2015/076853, filed Apr. 17, 2015, the disclosure of which is incorporated herein by reference in its entirety.

TECHNICAL FIELD

The present disclosure generally relates to the technical field of wireless communications, and particularly, to a method in an access node (AN) for signaling scheduling information to a terminal device, a method in a terminal device for performing scheduled communications and the associated AN and terminal device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Due to the increasing demand to enhance wireless capacity and due to lack of availability of spectrum in lower frequency range (e.g. 800 MHz-3 GHz), the use of frequencies in 10's of GHz range is being investigated. For the future wireless network, investigations are going on to explore higher frequency bands, for instance, in the range of 30 GHz, 60 GHz and 98 GHz. At this frequency, a very large bandwidth of spectrum is available. This means both operating frequency and bandwidth for the future networks are expected to be much higher than those for legacy wireless networks.

However, due to large signal attenuation with respect to path loss, the network operating over such high frequencies is supposed to cover small areas with densely deployed radio access nodes (ANs). Considering that such dense deployment is particularly useful to provide sufficient coverage for indoor/hot areas, it has been agreed to exploit Ultra-Density Network (UDN) or Super Dense Network (SDN), which is also referred to as millimeter Wave-Radio Access Technology (mmW-RAT), for the future wireless system.

Figure 1:
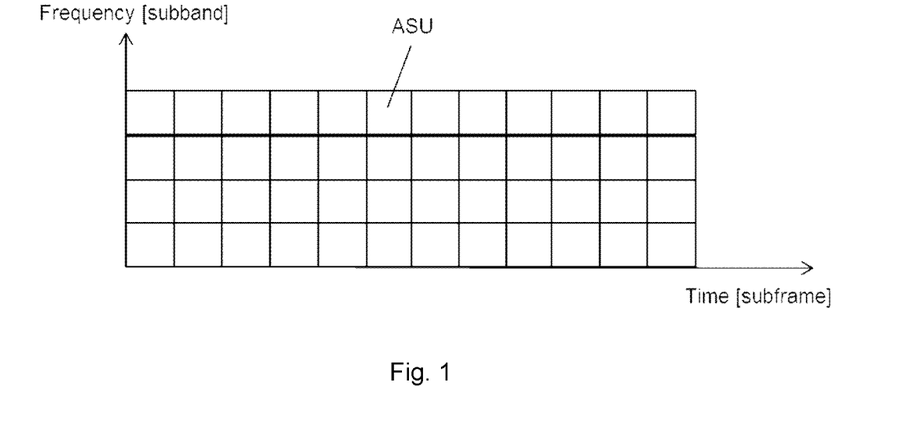
FIG. 1 is a diagram conceptually illustrating a mmW-RAT carrier and associated subbands, subframes and ASUs.

Currently, it is supposed that the total carrier bandwidth of the mmW-RAT can be up to 1 or 2 GHz. This bandwidth can be composed by a number of sub-band carriers of a certain bandwidth, e.g. 100 MHz. By way of example, FIG. 1 illustrates one mmW-RAT carrier with 4 sub-bands. The smallest resource grid in the figure is an Atomic Scheduling Unit (ASU), which is also called a resource block (RB) and corresponds to a subband in the frequency domain and to a subframe in the time domain.

To allocate the available resources, a scheduling based resource allocation scheme may be applied by configuring a Central Control Unit (CCU) which is shared by a cluster of ANs and relied on to allocate resources to different radio links. To be specific, the CCU configures, for each of the radio links associated with the ANs, a template frame indicating multiple types of resources allocated to the radio link.

Figure 2:
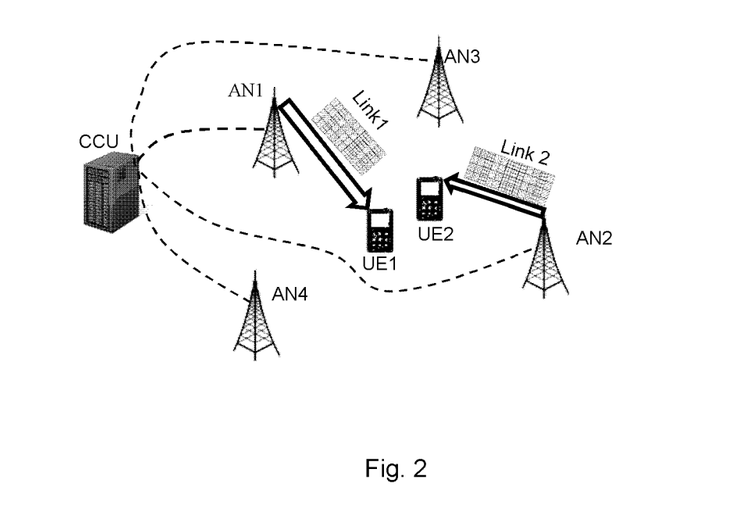
FIG. 2 is a diagram schematically illustrating an exemplary network where a scheduling based resource allocation scheme may be implemented.

For illustration, an exemplary radio network where the scheduling based resource allocation scheme may be implemented is depicted in FIG. 2. In addition to AN1-AN4, the network comprises a CCU responsible to determine, for radio link 1, a template frame based on relevant measurements and/or data rate requests from peer communication devices (i.e., AN1 and User Equipment 1 (UE1)) on radio link 1. Further, the template frame determined for radio link 1 can be updated by the CCU during a communication session according to various varying factors, such as interference measurements and/or data rate requests from radio link 2 which is the neighboring link of radio link 1. Likewise, the CCU determines a template frame for radio link 2 and updates the template frame by taking into account radio link 1's impact on radio link 2.

Figure 3:
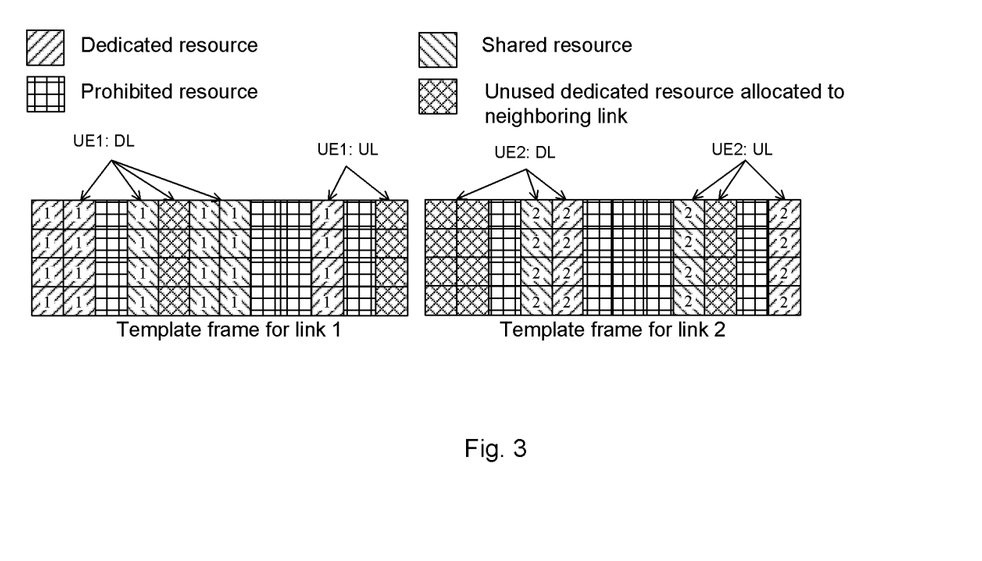
FIG. 3 is diagram schematically illustrating a template frame for each of radio links 1 and 2 in FIG. 2.

Further details of the template frames configured for radio links 1 and 2 are given in FIG. 3. Taking the template frame configured for link 1 as an example, the template frame specifies, for link 1 on which both downlink communications from AN 1 to UE 1 and uplink communications from UE 1 to AN 1 occur, dedicated resources, shared resources (also known as opportunistic resources) and prohibited resources, as illustrated in FIG. 3. In case AN 1 on link 1 is able to be aware of unused dedicated radio resources allocated to link 1's neighboring link (in this example, link 2), it can also locate such resources on the template frame configured for link 1, as illustrated in FIG. 3.

On the dedicated resources allocated to a radio link, data transmissions between peer communication devices on this link can be performed with high reliability. To be specific, if link 1 is allocated with certain dedicated resources, link 1 will have the highest priority to access these resources while link 2 shall control its interference to link 1 on these resources. However, in case certain dedicated resources allocated to link 2 are not being used by the peer communication devices on link 2, AN 1 can advantageously schedule its data transmissions from and/or to UE 1 on these resources.

On the shared resources allocated to a radio link, data transmissions of lower reliability can be performed between peer communication devices on this link to achieve enhanced data rate. To be specific, if link 1 is allocated with certain shared resources, both link 1 and link 2 can access these resources and the use of these resources by one of link 1 and link 2 may produce interference to the other.

On the prohibited resources for a radio link, data transmissions are not allowed to be performed between peer communication devices on the radio link.

After receiving the template frame configured by the CCU for link 1, AN 1 can then make various scheduling decisions for its transmissions to and/or from UE 1 (namely, for downlink and uplink communications on link 1). By way of example, AN 1 can determine a transmission power, a Modulation and Coding Scheme (MCS), a specific resource allocation, a transmission rank, a redundancy version or the like for either the downlink or the uplink communications on link 1. After determining the scheduling information, AN 1 can then notify the determined scheduling information to UE 1 in a scheduling command (also referred to as downlink assignment in downlink) so that UE 1 can receive downlink transmissions from AN 1 according to the scheduling information. Alternatively, AN 1 may notify the determined scheduling information to UE 1 in a scheduling grant in response to receiving a scheduling request from UE 1, so that UE 1 can transmit uplink transmissions to AN 1 according to the scheduling information.

According to the prior art solution for signaling the scheduling information to the UE, AN 1 generates and transmits to UE 1 a scheduling command or a scheduling grant (hereinafter collectively referred to as a scheduling message) for scheduling only one DL or UL data transmission in one DL or UL subframe on one carrier on link 1. As a result, the same set of data transmission configurations indicated by the scheduling message (including a transmission power, an MCS, a specific resource allocation, a transmission rank, a redundancy version or the like) has to be used for all radio resources on link 1. This undesirably leads to inefficient use of radio resources, because the optimal data transmission configuration, which allows for the highest possible spectral efficiency under the condition that the target acceptable transmission failure rate is satisfied, is different for different types of radio resources on link 1.

SUMMARY

In view of the foregoing, an object of the present disclosure is to overcome or at least mitigate the above shortcoming of the prior art solution for signaling scheduling information from an AN to a terminal device.

To achieve this object, according to a first aspect of the present disclosure, there is provided a method in an AN for signaling scheduling information to a terminal device. The method comprises generating one or more scheduling messages for scheduling data transmissions over two or more types of radio resources available on a radio link. The method further comprises transmitting the one or more scheduling messages to the terminal device.

According to a second aspect of the present disclosure, there is provided an AN for signaling scheduling information to a terminal device. The AN comprises a scheduling message generating section and a transmitting section. The scheduling message generating section is configured to generate one or more scheduling messages for scheduling data transmissions over two or more types of radio resources available on a radio link. The transmitting section is configured to transmit the one or more scheduling messages to the terminal device.

With the method and AN according to the first and second aspects of the present disclosure, more than one data transmissions can be scheduled over two or more types of radio resources available on a radio link according to the scheduling messages. As such, it is possible to use their respective optimal data transmission configurations for more than one type of radio resources on the link and thus increase the overall throughput on the link.

An additional object of the present disclosure is to provide a terminal device and a method therefor to be used with the above-described AN and the method therefor.

To achieve this object, according to a third aspect of the present disclosure, there is provided a method in a terminal device for performing scheduled communications. The method comprises receiving, from an AN, one or more scheduling messages, which are generated for scheduling data transmissions over two or more types of radio resources available on a radio link. The method further comprises performing the scheduled communications according to the received one or more scheduling messages.

According to a fourth aspect of the present disclosure, there is provided a terminal device for performing scheduled communications. The terminal device comprises a scheduling message receiving section and a communication section. The scheduling message receiving section is configured to receive, from an AN, one or more scheduling messages, which are generated for scheduling data transmissions over two or more types of radio resources available on a radio link. The communication section is configured to perform the scheduled communications according to the received one or more scheduling messages.

With the method and terminal device according to the third and fourth aspects of the present disclosure, the terminal device can perform scheduled uplink and downlink communications with the AN according to the received one or more scheduling messages. Because more than one data transmissions can be scheduled over two or more types of radio resources available on a radio link according to the scheduling messages, it is possible to use their respective optimal data transmission configurations for more than one type of radio resources on the link and thus increase the overall throughput on the link.

According to a fifth aspect of the present disclosure, there is provided an AN for signaling scheduling information to a terminal device. The AN comprises a processor and a memory. The memory has machine-readable program code stored therein. When executed by the processor, the program code causes the AN to perform the method according to the first aspect of the present disclosure.

According to a sixth aspect of the present disclosure, there is provided a terminal device for performing scheduled communications. The terminal device comprises a processor and a memory. The memory has machine-readable program code stored therein. When executed by the processor, the program code causes the terminal device to perform the method according to the third aspect of the present disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used to describe mmW-RAT technology is used in this disclosure to exemplify the embodiments, this should not be seen as limiting the scope of the techniques to only the aforementioned system. Other wireless systems may also benefit from exploiting the ideas covered within this disclosure, as long as a radio link in the wireless systems may be allocated with different types of schedulable resources.

Figure 4:
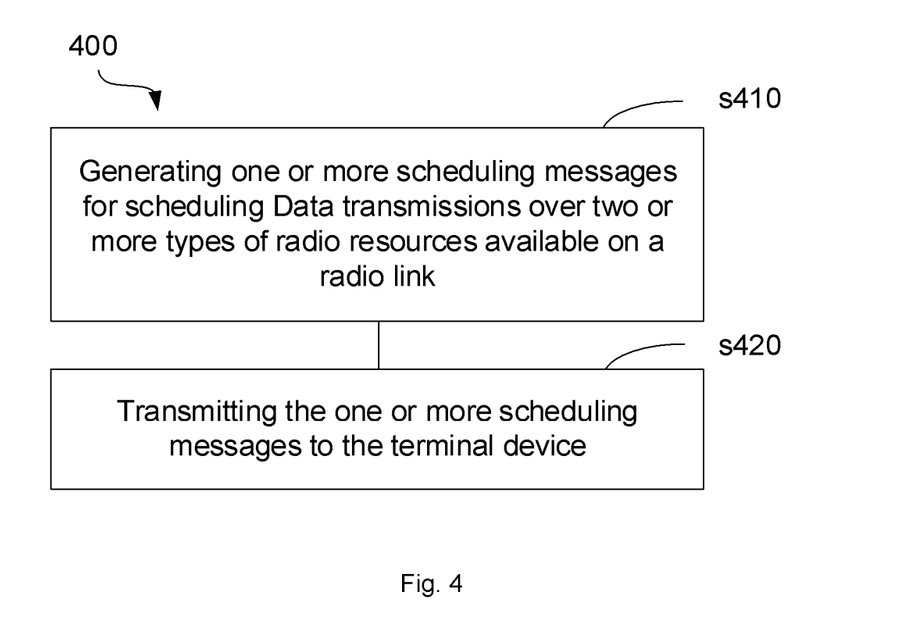
FIG. 4 is a flowchart illustrating a method embodiment implemented in an AN for signaling scheduling information to a terminal device according to the present disclosure.

FIG. 4 schematically illustrates a method 400 implemented in an AN for signaling scheduling information to a terminal device according to the present disclosure.

As illustrated, the method begins with step s410, at which one or more scheduling messages are generated for scheduling data transmissions over two or more types of radio resources available on a radio link. Then, it proceeds to step s420, at which the one or more scheduling messages are transmitted to the terminal device.

In contrast with the prior art scheduling information signaling approach which allows only one transmission to be scheduled on a radio link, the above-described method 400 allows more than one data transmissions to be scheduled over two or more types of radio resources available on a radio link. As such, it is possible to use their respective optimal data transmission configurations for more than one types of radio resources on the link and thus increase the overall throughput on the link.

In the case of the above-described mmW-RAT based wireless system where radio resources available on a radio link may comprise dedicated resources allocated to the radio link, shared radio resources allocated to the radio link and unused dedicated resources allocated to the radio link's neighboring link, at least one of the one or more scheduling messages may be generated for scheduling at least one corresponding data transmission on the dedicated radio resources for the radio link, and at least one of the one or more scheduling messages may be generated for scheduling at least one corresponding data transmission on the shared radio resources for the radio link and/or the unused dedicated radio resources for the radio link's neighboring link. As a specific example, the AN may generate a first scheduling message for scheduling a first data transmission on the dedicated radio resources for the radio link and a second scheduling message for scheduling a second data transmission on the shared radio resources for the radio link and the unused dedicated radio resources for the radio link's neighboring link.

Alternatively, at least one of the one or more scheduling messages may be generated for scheduling at least one corresponding data transmission on each of the two or more types of radio resources. As a specific example, the AN may generate a first scheduling message for scheduling a first data transmission on the dedicated radio resources for the radio link, a second scheduling message for scheduling a second data transmission on the shared radio resources for the radio link and a third scheduling message for scheduling a third data transmission on the unused dedicated radio resources for the radio link's neighboring link.

In case one of the two or more types of the radio resources may be classified into at least one groups of radio resources according to interference levels and/or signal qualities at the radio resources, at least one of the one or more scheduling messages may be generated for scheduling at least one corresponding data transmissions on the at least one groups of radio resources respectively. As a specific example, in case the dedicated radio resources may be classified into a first group of dedicated radio resources at which the interference level is higher than or equal to a threshold and a second group of dedicated radio resources at which the interference level is lower than the threshold, the AN may generate two scheduling messages for scheduling two data transmissions on the first and the second groups of dedicated radio resources respectively.

In an embodiment, at least one of the one or more scheduling messages may be an integrated scheduling message containing two or more scheduling information segments, each of which is for scheduling a corresponding one of the data transmissions. As such, the number of scheduling messages to be transmitted from the AN to the terminal device and thus the complexity for decoding the scheduling messages at the terminal device can be reduced as compared with the case where each scheduling message is for scheduling a corresponding data transmission.

In practical implementation, at least one of the two or more scheduling information segments may be for scheduling at least one corresponding data transmission on dedicated radio resources for the radio link, and at least one of the two or more scheduling information segments may be for scheduling at least one corresponding data transmission on shared radio resources for the radio link and unused dedicated radio resources for the radio link's neighboring link.

In case one of the two or more types of the radio resources may be classified into at least one group of radio resources according to interference levels and/or signal qualities at the radio resources, at least one of the two or more scheduling information segments may be for scheduling at least one corresponding data transmissions on the at least one group of radio resources respectively.

Alternatively, a single integrated scheduling message may be generated for scheduling all data transmissions over the two or more types of radio resources.

Figure 5:
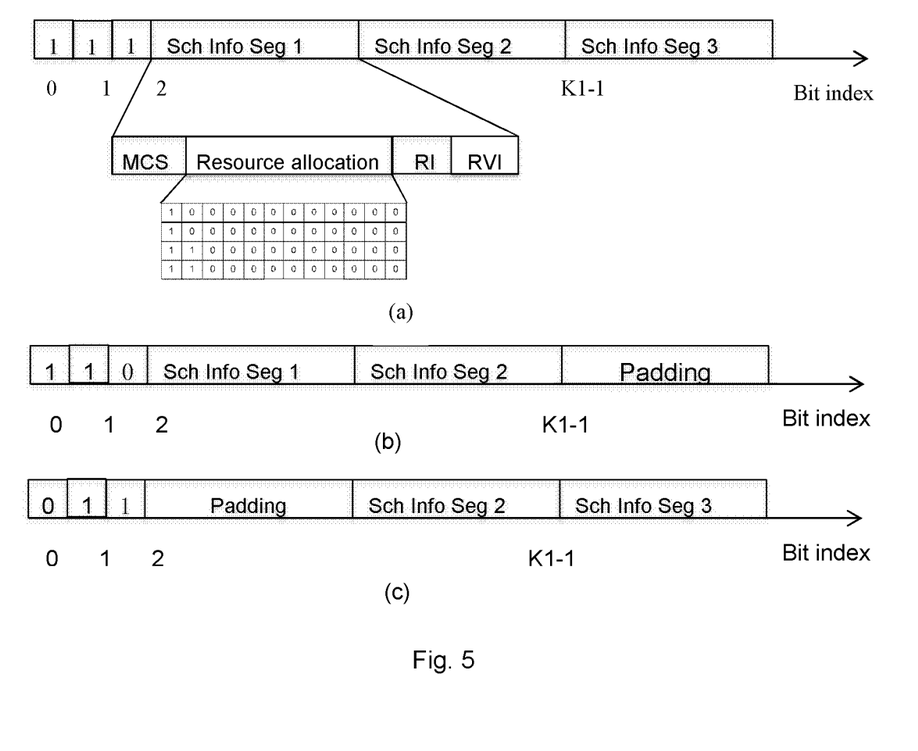
FIG. 5 is a diagram schematically illustrating three examples of an integrated scheduling message of a fixed length according to the present disclosure.

FIG. 5 gives three examples of an integrated scheduling message having a fixed length. By way of illustration rather than limitation, the integrated scheduling message may include, at its beginning, a sequence of bits each indicating the presence/absence of a corresponding scheduling information segments in the integrated scheduling message. Each of the scheduling information segments may include, for its corresponding data transmission, at least one field indicating at least one of an MCS, a resource allocation, a transmission rank or a redundancy version.

Referring specifically to FIG. 5(a), the integrated scheduling message includes at its beginning a bit sequence of 111, indicating the presence of a first scheduling information segment for scheduling a first data transmission on the dedicated radio resources configured for the radio link, a second scheduling information segment for scheduling a second data transmission on the shared radio resources configured for the radio link and a third scheduling information segment for scheduling a third data transmission on the unused dedicated radio resources configured for the radio link's neighboring link.

In FIG. 5(b), the integrated scheduling message includes at its beginning a bit sequence of 110, indicating the presence of the first scheduling information segment and a second scheduling information segment and the absence of the third scheduling information segment.

In FIG. 5(c), the integrated scheduling message includes at its beginning a bit sequence of 011, indicating the absence of the first scheduling information segment and the presence of the second scheduling information segment and the third scheduling information segment.

As can be seen from FIGS. 5(b) and 5(c), in case a scheduling information segment is absent from the integrated scheduling message, padding bits are inserted in the integrated scheduling message for the absent scheduling information segment.

Figure 6:
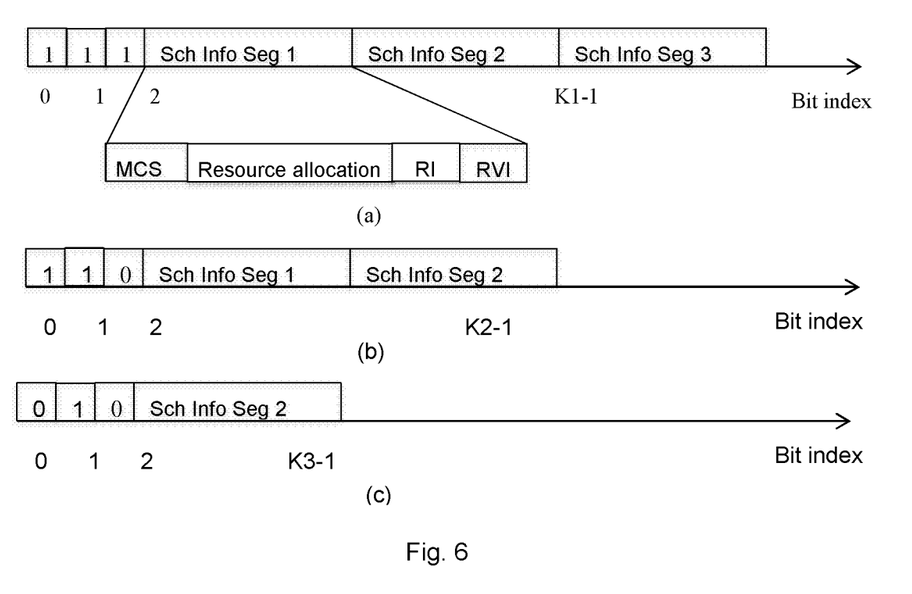
FIG. 6 is a diagram schematically illustrating three examples of an integrated scheduling message of a variable length according to the present disclosure.

To reduce the signaling overhead of the integrated scheduling message, padding bits may not be inserted for an absent scheduling information segment and the integrated scheduling message may have a flexible length, as illustrated in FIG. 6.

To further reduce the signaling overhead of the integrated scheduling message, the integrated scheduling message may include a common field indicating resource allocations for corresponding data transmissions scheduled by the scheduling information segments, while the scheduling information segments do not include fields indicating resource allocations for their corresponding data transmissions respectively.

Figure 7:
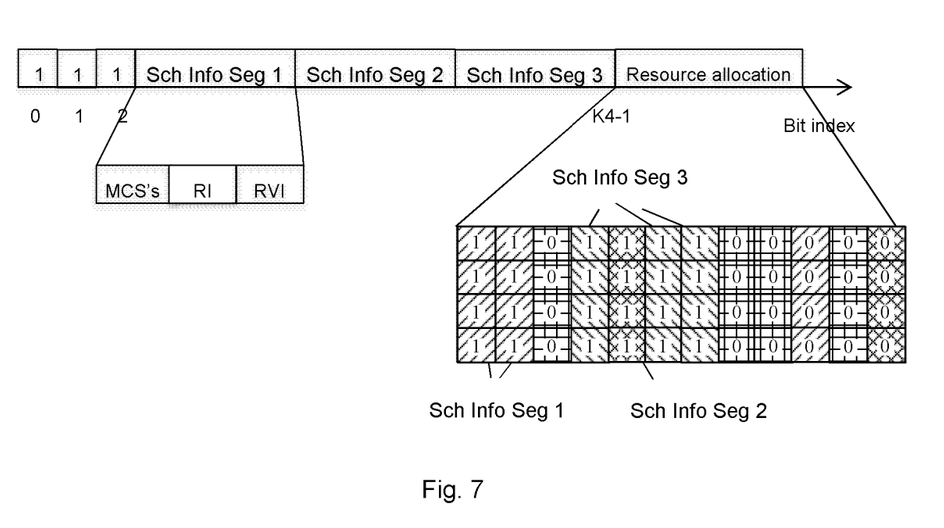
FIG. 7 is a diagram schematically illustrating an example of an integrated scheduling message including a common resource allocation field according to the present disclosure.

As illustrated in FIG. 7, instead of including in each of the first, the second and the third scheduling information segments a resource allocation field as illustrated in FIGS. 5 and 6, the integrated scheduling message includes a common field indicating resource allocations for corresponding data transmissions scheduled by the first, the second and the third scheduling information segments. By way of illustration rather than limitation, the resource allocation field is a table of bits corresponding to the ASUs available on the link and each of the bits indicating whether its corresponding ASU is allocated for data transmission.

In an embodiment, the scheduling messages may be generated periodically. For example, the scheduling messages may be generated on a per subframe basis.

In an embodiment, the scheduling messages may be transmitted to the terminal device in a part of radio resources among the dedicated radio resources for the radio link. For example, the scheduling messages may be transmitted to the terminal device in the first and second ASUs among dedicated ASUs available on a radio link.

Alternatively, in case at least one of the one or more scheduling messages is generated for scheduling at least one corresponding data transmission on each of the two or more types of radio resources, the at least one of the one or more scheduling messages may be transmitted to the terminal device in a part of radio resources among the respective type of radio resources. For example, in case a first scheduling message is generated for scheduling a first data transmission on dedicated ASUs available on the radio link and a second scheduling message is generated for scheduling a second data transmission on shared ASUs available on the radio link, the first scheduling message may be transmitted to the terminal device in the first and second ASUs among the dedicated ASUs and the second scheduling message may be transmitted to the terminal device in the first and second ASUs among the shared ASUs.

In practical implementation, the part of radio resources in which the scheduling messages are transmitted to the terminal device may be determined according to a predefined rule or configured by the CCU.

Figure 8:
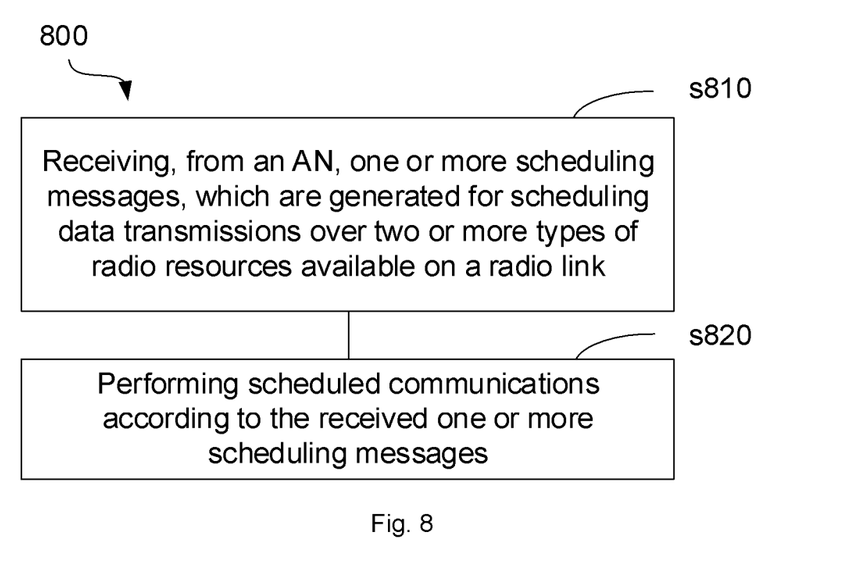
FIG. 8 is a flowchart illustrating a method embodiment implemented in a terminal device for performing scheduled communications according to the present disclosure.

Correspondingly to the above-described method 400 for signaling scheduling information from an AN to a terminal device, the present disclosure provides a method 800 in a terminal device for performing scheduled communications.

As illustrated in FIG. 8, the method begins with step s810, at which one or more scheduling messages, which are generated for scheduling data transmissions over two or more types of radio resources available on a radio link, are received from an AN. Then, it proceeds to step s820, at which the scheduled communications are performed according to the received one or more scheduling messages. Here, the scheduled communications include both scheduled downlink communications from the AN to the terminal device and scheduled uplink communications from the terminal device to the AN.

As those skilled in the art will appreciate, all the embodiments described above with respect to method 400 are also applicable to method 800.

For example, at least one of the one or more scheduling messages may contain two or more scheduling information segments, each of which is for scheduling a corresponding one of the data transmissions. The scheduling messages may be generated for one subframe.

In the following, structures of an AN 900 and a terminal device 1000 according to the present disclosure will be given with reference to FIGS. 9-10. The AN 900 is provided for signaling scheduling information to a terminal device. The terminal device 1000 is provided for performing scheduled communications.

Figure 9:
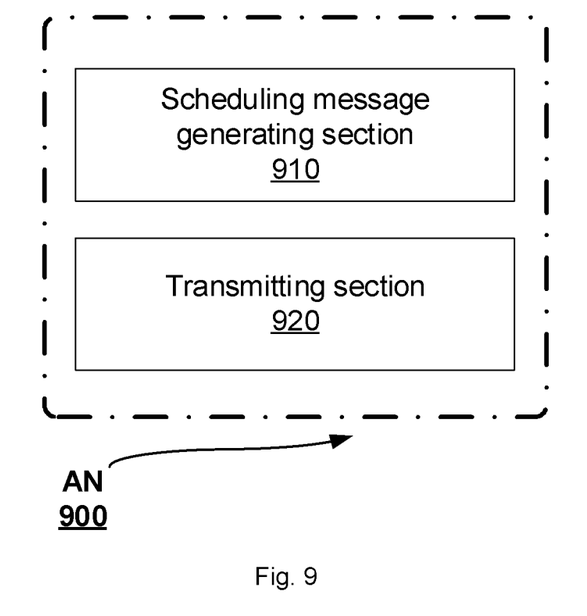
FIG. 9 is a block diagram illustrating an exemplary structure of an AN according to the present disclosure.

As shown in FIG. 9, the AN 900 comprises a scheduling message generating section 910 and a transmitting section 920. The scheduling message generating section 910 is configured to generate one or more scheduling messages for scheduling data transmissions over two or more types of radio resources available on a radio link. The transmitting section 920 is configured to transmit the one or more scheduling messages to the terminal device.

In an embodiment, at least one of the one or more scheduling messages may contain two or more scheduling information segments, each of which is for scheduling a corresponding one of the data transmissions.

In an embodiment, the scheduling messages may be generated for one subframe.

In an embodiment, at least one of the one or more scheduling messages may be generated for scheduling at least one corresponding data transmission on dedicated radio resources for the radio link, and at least one of the one or more scheduling messages may be generated for scheduling at least one corresponding data transmission on shared radio resources for the radio link and/or unused dedicated radio resources for the radio link's neighboring link.

In an embodiment, at least one of the one or more scheduling messages may be generated for scheduling at least one corresponding data transmission on each of the two or more types of radio resources.

In an embodiment, at least one of the one or more scheduling messages may be generated for scheduling at least one corresponding data transmissions on at least one groups of radio resources respectively, into which one of the two or more types of the radio resources are classified according to interference levels and/or signal qualities at the radio resources.

In an embodiment, at least one of the two or more scheduling information segments may be for scheduling at least one corresponding data transmission on dedicated radio resources for the radio link, and at least one of the two or more scheduling information segments may be for scheduling at least one corresponding data transmission on shared radio resources for the radio link and unused dedicated radio resources for the radio link's neighboring link.

In an embodiment, at least one of the two or more scheduling information segments may be for scheduling at least one corresponding data transmissions on at least one groups of radio resources respectively, into which one of the two or more types of the radio resources are classified according to interference levels and/or signal qualities at the radio resources.

In an embodiment, a single scheduling message may be generated for scheduling the data transmissions over the two or more types of radio resources.

In an embodiment, each of the scheduling information segments may include, for its corresponding data transmission, at least one field indicating at least one of a Modulation and Coding Scheme (MCS), a resource allocation, a transmission rank or a redundancy version.

In an embodiment, said at least one scheduling message may include, at its beginning, a sequence of bits each indicating the presence/absence of a corresponding scheduling information segments in said at least one scheduling message.

In an embodiment, said at least one scheduling message may have a fixed length or a flexible length. When said at least one scheduling message has the fixed length, padding bits may be inserted in said at least one scheduling message for an absent scheduling information segment.

In an embodiment, said at least one scheduling message may include a common field indicating resource allocations for corresponding data transmissions scheduled by the scheduling information segments, while the scheduling information segments may not include fields indicating resource allocations for their corresponding data transmissions respectively.

In an embodiment, the scheduling messages may be transmitted to the terminal device in a part of radio resources among the dedicated radio resources for the radio link.

In an embodiment, said at least one of the one or more scheduling messages may be transmitted to the terminal device in a part of radio resources among said each of the two or more types of radio resources.

In an embodiment, the part of radio resources may be determined according to a predefined rule or configured by a CCU.

As those skilled in the art will appreciate, the above-described sections may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the communication device may comprise a transceiver, a memory and a processor (including but not limited to a microprocessor, a microcontroller or a Digital Signal Processor (DSP), etc.) The memory stores machine-readable program code executable by the processor. The processor, when executing the machine-readable program code, performs the function of the above-described scheduling message generating section and controls the transceiver to perform the function of the above-described transmitting section.

Figure 10:
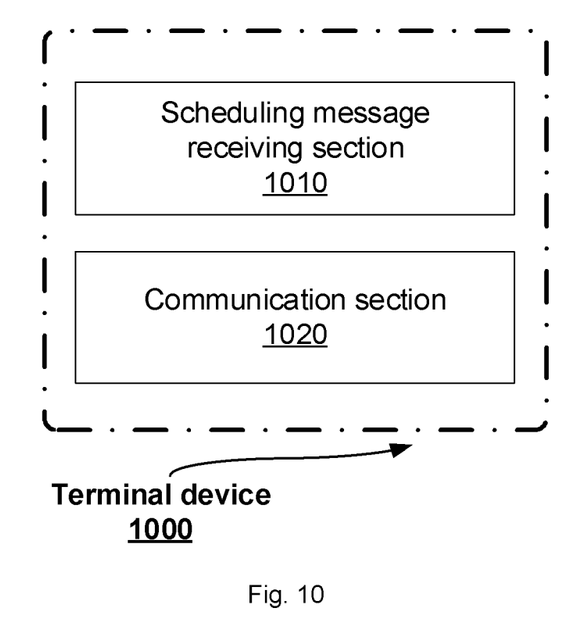
FIG. 10 is a block diagram illustrating an exemplary structure of a terminal device according to the present disclosure.

Referring then to FIG. 10, the terminal device 1000 comprises a scheduling message receiving section 1010 and a data communication section 1020. The scheduling message receiving section 1010 is configured to receive, from an AN, one or more scheduling messages, which are generated for scheduling data transmissions over two or more types of radio resources available on a radio link. The data communication section 1020 is configured to perform the scheduled communications according to the received one or more scheduling messages.

In an embodiment, at least one of the one or more scheduling messages may contain two or more scheduling information segments, each of which is for scheduling a corresponding one of the data transmissions.

In an embodiment, the scheduling messages may be generated for one subframe. As those skilled in the art will appreciate, the above-described sections may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the terminal device may comprise a transceiver, a memory and a processor (including but not limited to a microprocessor, a microcontroller or a Digital Signal Processor (DSP), etc.)

The memory stores machine-readable program code executable by the processor. The processor, when executing the machine-readable program code, controls the transceiver to perform functions of the above-described scheduling message receiving section 1010 and data communication section 1020.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method in an Access Node (AN) for signaling scheduling information to a terminal device, the method comprising:
   generating one or more scheduling messages for scheduling data transmissions over two or more types of radio resources available on a radio link, wherein at least one of the one or more scheduling messages is generated for scheduling at least one corresponding data transmission on dedicated radio resources for the radio link, on shared radio resources for the radio link, and on unused dedicated radio resources for the radio link's neighboring link; and
   transmitting the one or more scheduling messages to the terminal device in a part of radio resources among each of the two or more types of radio resources.

2. The method of claim 1, wherein
   at least one of the one or more scheduling messages contains two or more scheduling information segments, each of which is for scheduling a corresponding one of the data transmissions.

3. The method of claim 1, wherein the one or more scheduling messages are generated for one subframe.

4. The method of claim 1, wherein
   at least one of the one or more scheduling messages is generated for scheduling at least one corresponding data transmission on at least one group of the radio resources respectively, into which one of the two or more types of the radio resources are classified according to interference levels and/or signal qualities at the radio resources.

5. The method of claim 2, wherein:
   at least one of the two or more scheduling information segments is for scheduling at least one corresponding data transmission on the dedicated radio resources for the radio link, and
   at least one of the two or more scheduling information segments is for scheduling at least one corresponding data transmission on the shared radio resources for the radio link and the unused dedicated radio resources for the radio link's neighboring link.

6. The method of claim 2, wherein
   at least one of the two or more scheduling information segments is for scheduling at least one corresponding data transmission on at least one group of the radio resources respectively, into which one of the two or more types of the radio resources are classified according to interference levels and/or signal qualities at the radio resources.

7. The method of claim 2, wherein
   a single scheduling message is generated for scheduling the data transmissions over the two or more types of radio resources.

8. The method of claim 2, wherein
   each of the two or more scheduling information segments include, for said corresponding one of the data transmissions, at least one field indicating at least one of the following:
   a Modulation and Coding Scheme (MCS);
   a resource allocation;
   a transmission rank; or
   a redundancy version.

9. The method of claim 2, wherein
   said at least one scheduling message includes, at a beginning of said at least one scheduling message, a sequence of bits each indicating the presence/absence of corresponding scheduling information segments in said at least one scheduling message.

10. The method of claim 9, wherein:
    said at least one scheduling message has a fixed length or a flexible length, and
    when said at least one scheduling message has the fixed length, padding bits are inserted in said at least one scheduling message for an absent scheduling information segment.

11. The method of claim 2, wherein
    said at least one scheduling message includes a common field indicating resource allocations for corresponding data transmissions scheduled by the two or more scheduling information segments, while the two or more scheduling information segments do not include fields indicating resource allocations for the corresponding data transmissions respectively.

12. The method of claim 1, wherein
    the one or more scheduling messages are transmitted to the terminal device in the part of radio resources among the dedicated radio resources for the radio link.

13. The method of claim 1, wherein
    the part of radio resources is determined according to a predefined rule or configured by a Central Control Unit (CCU).

14. A method in a terminal device for performing scheduled communications, the method comprising:
    receiving, from an Access Node (AN), one or more scheduling messages in a part of radio resources among each of two or more types of radio resources available on a radio link, wherein the one or more scheduling messages are generated for scheduling data transmissions over the two or more types of radio resources available on the radio link, wherein at least one of the one or more scheduling messages is generated for scheduling at least one corresponding data transmission on dedicated radio resources for the radio link, on shared radio resources for the radio link, and on unused dedicated radio resources for the radio link's neighboring link; and
    performing the scheduled communications according to the received one or more scheduling messages.

15. The method of claim 14, wherein
    at least one of the one or more scheduling messages contains two or more scheduling information segments, each of which is for scheduling a corresponding one of the data transmissions.

16. The method of claim 14, wherein the one or more scheduling messages are generated for one subframe.

17. An Access Node (AN) for signaling scheduling information to a terminal device, the AN comprising:
    a scheduling message generating section configured to generate one or more scheduling messages for scheduling data transmissions over two or more types of radio resources available on a radio link, wherein at least one of the one or more scheduling messages is generated for scheduling at least one corresponding data transmission on dedicated radio resources for the radio link, on shared radio resources for the radio link, and on unused dedicated radio resources for the radio link's neighboring link; and a transmitting section configured to transmit the one or more scheduling messages to the terminal device in a part of radio resources among each of the two or more types of radio resources.

18. The AN of claim 17, wherein
at least one of the one or more scheduling messages contains two or more scheduling information segments, each of which is for scheduling a corresponding one of the data transmissions.

19. The AN of claim 17, wherein the one or more scheduling messages are generated for one subframe.

20. The AN of claim 17, wherein
at least one of the one or more scheduling messages is generated for scheduling at least one corresponding data transmission on at least one group of the radio resources respectively, into which one of the two or more types of the radio resources are classified according to interference levels and/or signal qualities at the radio resources.

21. The AN of claim 18, wherein:
at least one of the two or more scheduling information segments is for scheduling at least one corresponding data transmission on the dedicated radio resources for the radio link, and
at least one of the two or more scheduling information segments is for scheduling at least one corresponding data transmission on the shared radio resources for the radio link and the unused dedicated radio resources for the radio link's neighboring link.

22. The AN of claim 18, wherein
at least one of the two or more scheduling information segments is for scheduling at least one corresponding data transmission on at least one group of the radio resources respectively, into which one of the two or more types of the radio resources are classified according to interference levels and/or signal qualities at the radio resources.

23. The AN of claim 18, wherein
a single scheduling message is generated for scheduling the data transmissions over the two or more types of radio resources.

24. The AN of claim 18, wherein
each of the two or more scheduling information segments include, for said corresponding one of the data transmissions, at least one field indicating at least one of the following:

a Modulation and Coding Scheme (MCS);
a resource allocation;
a transmission rank; or
a redundancy version.

25. The AN of claim 18, wherein
said at least one scheduling message includes, at a beginning of said at least one scheduling message, a sequence of bits each indicating the presence/absence of corresponding scheduling information segments in said at least one scheduling message.

26. The AN of claim 25, wherein:
said at least one scheduling message has a fixed length or a flexible length, and
when said at least one scheduling message has the fixed length, padding bits are inserted in said at least one scheduling message for an absent scheduling information segment.

27. The AN of claim 18, wherein said at least one scheduling message includes a common field indicating resource allocations for corresponding data transmissions scheduled by the two or more scheduling information segments, while the two or more scheduling information segments do not include fields indicating resource allocations for the corresponding data transmissions respectively.

28. The AN of claim 17, wherein the one or more scheduling messages are transmitted to the terminal device in the part of radio resources among the dedicated radio resources for the radio link.

29. The AN of claim 17, wherein
the part of radio resources is determined according to a predefined rule or configured by a Central Control Unit (CCU).

30. A terminal device for performing scheduled communications, the terminal device comprising:
a scheduling message receiving section configured to receive, from an Access Node (AN), one or more scheduling messages in a part of radio resources among each of two or more types of radio resources available on a radio link, wherein the one or more scheduling messages are generated for scheduling data transmissions over the two or more types of radio resources available on the radio link, wherein at least one of the one or more scheduling messages is generated for scheduling at least one corresponding data transmission on dedicated radio resources for the radio link, on shared radio resources for the radio link, and on unused dedicated radio resources for the radio link's neighboring link; and
a data communication section configured to perform the scheduled communications according to the received one or more scheduling messages.

31. The terminal device of claim 30, wherein
at least one of the one or more scheduling messages contains two or more scheduling information segments, each of which is for scheduling a corresponding one of the data transmissions.

32. The terminal device of claim 30, wherein the one or more scheduling messages are generated for one subframe.

* * * * *